United States Patent
Keränen et al.

(10) Patent No.: US 11,924,309 B2
(45) Date of Patent: Mar. 5, 2024

(54) MANAGING RESOURCE STATE NOTIFICATIONS

(71) Applicant: Telefonaktiebolaget LM Ericsson (publ), Stockholm (SE)

(72) Inventors: Ari Keränen, Helsinki (FI); Jaime Jiménez, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

(21) Appl. No.: 17/784,726

(22) PCT Filed: Dec. 13, 2019

(86) PCT No.: PCT/EP2019/085177
§ 371 (c)(1),
(2) Date: Jun. 13, 2022

(87) PCT Pub. No.: WO2021/115622
PCT Pub. Date: Jun. 17, 2021

(65) Prior Publication Data
US 2023/0017593 A1    Jan. 19, 2023

(51) Int. Cl.
*H04L 67/75*    (2022.01)
*G06F 11/30*    (2006.01)

(52) U.S. Cl.
CPC .......... *H04L 67/75* (2022.05); *G06F 11/3072* (2013.01)

(58) Field of Classification Search
None
See application file for complete search history.

(56) References Cited

U.S. PATENT DOCUMENTS

| | | | |
|---|---|---|---|
| 2010/0281159 A1* | 11/2010 | Boscolo | H04L 63/20 709/224 |
| 2018/0157384 A1 | 6/2018 | Baneva et al. | |
| 2019/0068735 A1* | 2/2019 | Alcorn | H04L 63/0428 |

FOREIGN PATENT DOCUMENTS

| KR | 20190064066 A | 6/2019 |
|---|---|---|
| WO | 2014067311 A1 | 5/2014 |

OTHER PUBLICATIONS

Author Unknown, "Lightweight Machine to Machine Technical Specification: Core," Version 1.1.1, Jun. 17, 2019, Open Mobile Alliance, 130 pages.
Bormann, et al., "Terminology for Constrained-Node Networks," Request for Comments 7228, May 2014, Internet Engineering Task Force, 17 pages.

(Continued)

*Primary Examiner* — Angela Nguyen
(74) *Attorney, Agent, or Firm* — Withrow & Terranova, PLLC

(57) ABSTRACT

A method is disclosed for managing notifications about a resource exposed by a computing device. The method, performed by a node, comprises sending a message to the computing device, the message registering the node for notifications about the state of the resource and specifying, in a message to the computing device, a limitation on a notification payload size, the limitation applicable to notifications about the state of the resource. Also disclosed are a method performed by a computing device, a node, a computing device and a computer program product.

20 Claims, 12 Drawing Sheets

(56) References Cited

OTHER PUBLICATIONS

Shelby, et al., "Constrained RESTful Environments (CoRE) Link Format," Request for Comments 6690, Aug. 2012, Internet Engineering Task Force, 22 pages.
Shelby, et al., "Dynamic Resource Linking for Constrained RESTful Environments draft-ietf-core-dynlink-10," Internet Draft, Jul. 22, 2019, CoRE Working Group, 24 pages.
Shelby, et al., "The Constrained Application Protocol (CoAP)," Request for Comments 7252, Jun. 2014, Internet Engineering Task Force, 112 pages.
International Search Report and Written Opinion for International Patent Application No. PCT/EP2019/085177, dated Jul. 24, 2020, 8 pages.
International Preliminary Report on Patentability for International Patent Application No. PCT/EP2019/085177, dated Feb. 28, 2022, 16 pages.

* cited by examiner

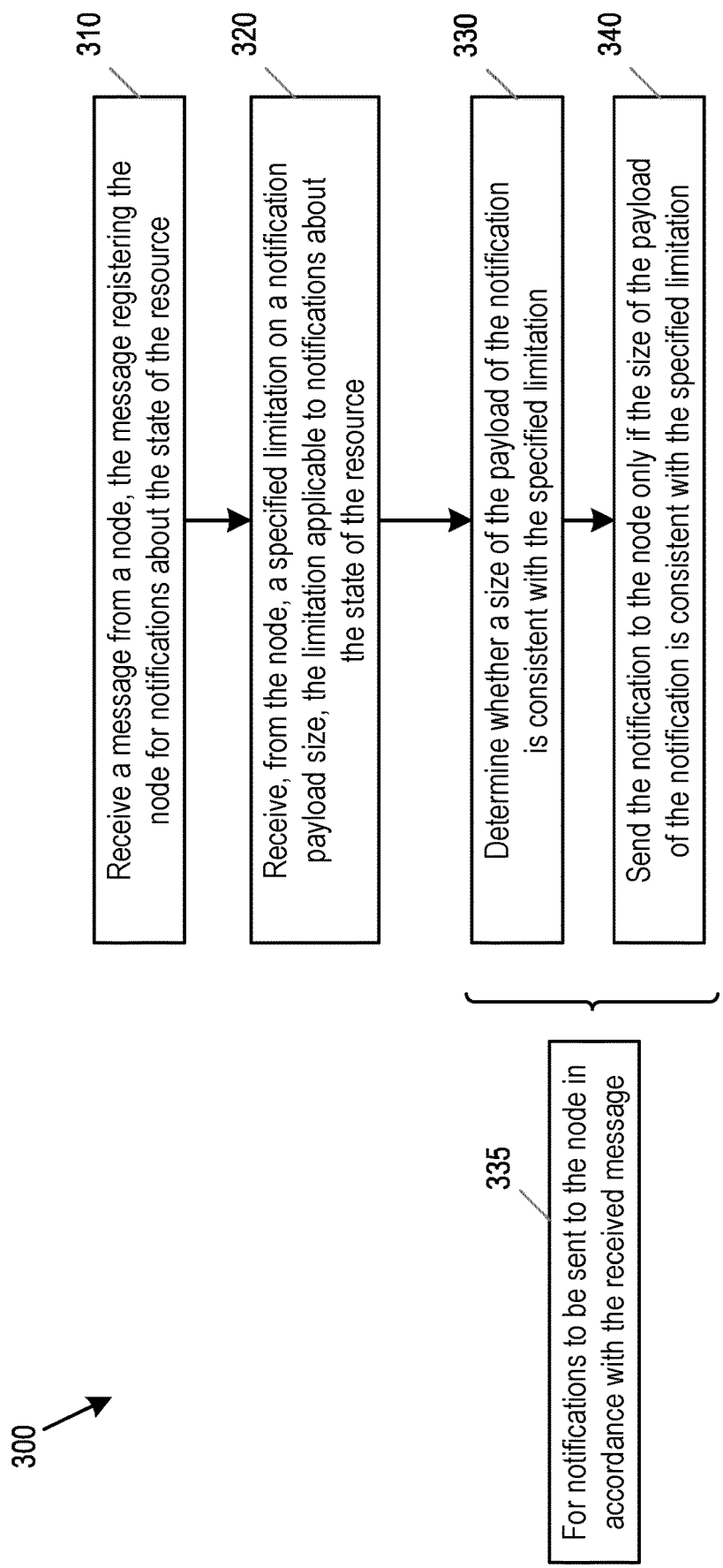

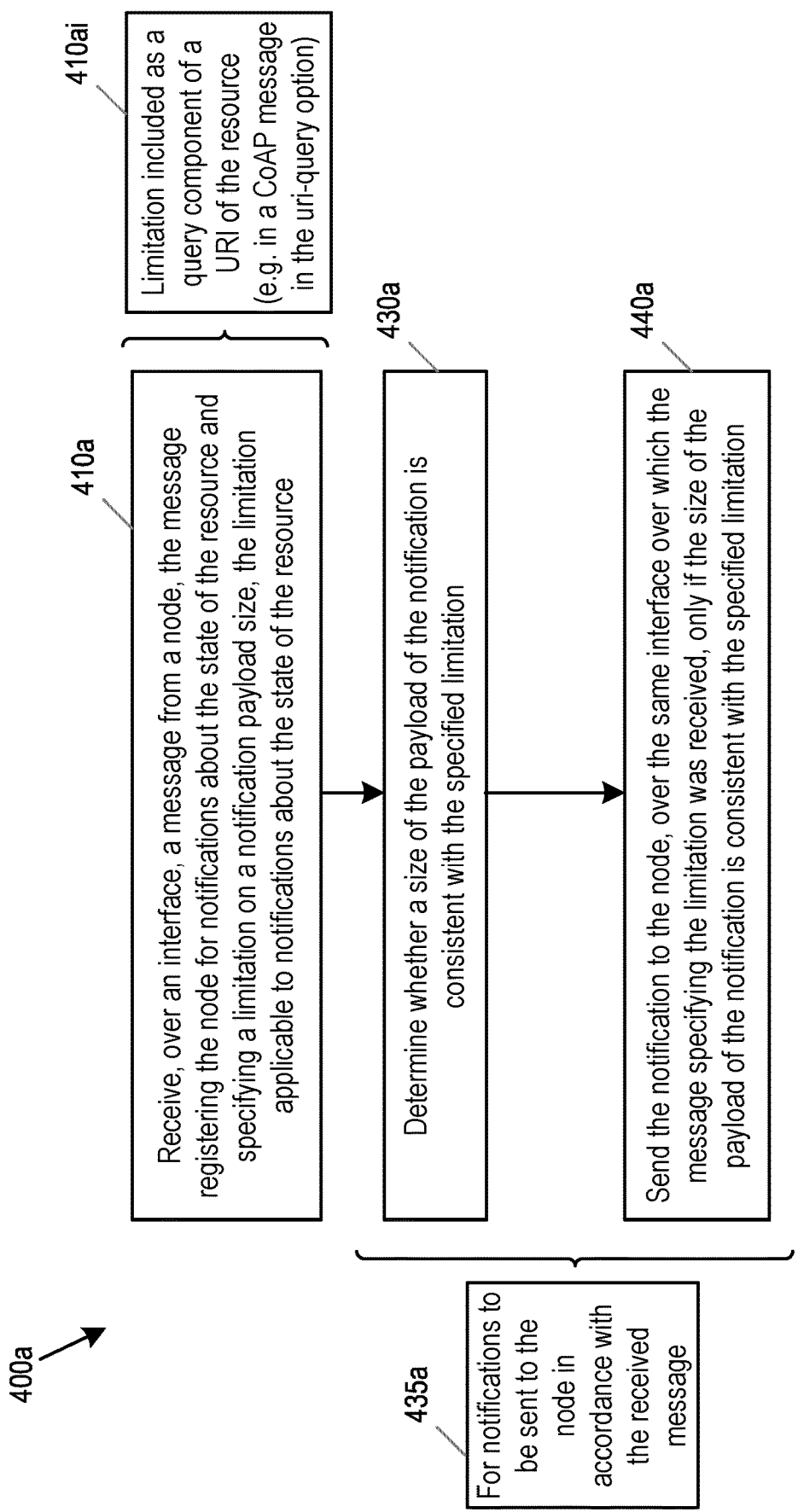

MANAGING RESOURCE STATE NOTIFICATIONS

This application is a 35 U.S.C. § 371 national phase filing of International Application No. PCT/EP2019/085177, filed Dec. 13, 2019, the disclosure of which is incorporated herein by reference in its entirety.

TECHNICAL FIELD

The present disclosure relates to methods for managing notifications about a resource exposed by a computing device, the methods performed by the computing device and by a node. The present disclosure also relates to a computing device, a node, and to a computer program and computing program product configured, when run on a computer, to carry out methods for managing notifications about a resource exposed by a computing device.

BACKGROUND

The "Internet of Things" (IoT) refers to devices enabled for communication network connectivity, so that these devices may be remotely managed, and data collected or required by the devices may be exchanged between individual devices and between devices and application servers. Such devices, examples of which may include sensors and actuators, are often, although not necessarily, subject to severe limitations on processing power, storage capacity, energy supply, device complexity and/or network connectivity, imposed by their operating environment or situation, and may consequently be referred to as constrained devices. Constrained devices often connect to the core network via gateways using short range radio technologies. Information collected from the constrained devices may then be used to create value in cloud environments.

The constrained nature of IoT devices has prompted the design and implementation of new protocols and mechanisms. The Constrained Application Protocol (CoAP), as defined in RFC 7252, is one example of a protocol designed for IoT applications in constrained nodes and constrained networks. CoAP provides a request-response based RESTful communication architecture between constrained nodes or between constrained nodes and nodes on the Internet. CoAP can easily be integrated to the web and web services by translating CoAP messages to HTTP. CoAP follows a client/server model and employs a two layer structure including the Message Layer, and the Request/Response layer. The Request/Response layer supports methods including GET, PUT, POST and DELETE, allowing for the access, modification, or deletion of resources.

The Open Mobile Alliance (OMA) Lightweight Device Management (DM) protocol, also known as the Lightweight Machine to Machine protocol (LWM2M), is a light and compact device management protocol that may be used for managing IoT devices and their resources. LWM2M is designed to run on top of CoAP, which either uses UDP or SMS bindings. LWM2M is therefore compatible with any constrained device which supports CoAP.

Basic CoAP requires a CoAP client that is interested in the state of a resource to initiate a request to the appropriate CoAP server every time it wishes to obtain a current representation of the resource. The Observe protocol, as defined in RFC 7641, is an extension to the CoAP protocol which enables CoAP clients to "observe" resources over a period of time. A CoAP client may register its interest in a resource by sending an extended GET request. The extended GET request includes an Observe option, a value of which may be set to 0 (Observe registration) or 1 (Observe deregistration). If the value of the Observe option included in the request is set to 0, the CoAP server will add the CoAP client to a list of observers of the resource. If the value of the Observe option included in the Request is set to 1, the CoAP server will remove the CoAP client from the list of observers of the resource. Whenever the state of a resource changes, the CoAP server responsible for that resource will notify the state change to each CoAP client in its list of observers of the current state of the resource. Each notification is an additional CoAP response message sent by the CoAP server in reply to an original Observe registration, and includes a complete, updated representation of the new resource state. This CoAP response also comprises an Observe option, the value of which may comprise a sequence number for correctly ordering the notifications and enabling reordering detection. All notifications carry the token specified by the CoAP client in the original Observe registration, enabling the CoAP client to correctly correlate notifications to the original request.

According to the Observe protocol, every CoAP client observing a resource exposed by a CoAP server will receive the same notifications whenever the state of the resource changes. These notifications may contain payloads of significant size, meaning that processing the payload can require significant energy expenditure for constrained devices. In addition, the network over which the devices communicate may also be constrained, and may therefore become congested with notifications having payloads that are larger than the network can accommodate.

SUMMARY

It is an aim of the present disclosure to provide methods, a computing device, a node and a computer program and computer readable medium which at least partially address one or more of the challenges discussed above.

According to a first aspect of the present disclosure, there is provided a method for managing notifications about a resource exposed by a computing device. The method, performed by a node, comprises sending a message to the computing device, the message registering the node for notifications about the state of the resource, and specifying, in a message to the computing device, a limitation on a notification payload size, the limitation applicable to notifications about the state of the resource.

A node may comprise any device, server or other entity that is operable to connect to a network. The node may for example comprise a management server, or may comprise a computing device, as discussed below.

According to another aspect of the present disclosure, there is provided a method for managing notifications about a resource exposed by a computing device. The method, performed by computing device, comprises receiving a message from a node, the message registering the node for notifications about the state of the resource and receiving, from the node, a specified limitation on a notification payload size, the limitation applicable to notifications about the state of the resource. The method further comprises, for notifications to be sent to the node in accordance with the received message, determining whether a size of the payload of the notification is consistent with the specified limitation, and sending the notification to the node only if the size of the payload of the notification is consistent with the specified limitation.

A computing device may comprise any device that is provided with some form of processing circuitry and is operable to expose at least one resource to a network. A computing device according to the present disclosure may in come examples comprise a constrained device. For the purposes of the present disclosure, a constrained device comprises a device which conforms to the definition set out in section 2.1 of RFC 7228 for "constrained node".

According to the definition in RFC 7228, a constrained node is a node in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". A constrained device according to examples of the present disclosure is thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content, for example within a room or while goods are transported and stored; motion sensors for controlling light bulbs; sensors measuring light that can be used to control shutters; heart rate monitors and other sensors for personal health (continuous monitoring of blood pressure etc.); and actuators including for example connected electronic door locks. A constrained network correspondingly comprises "a network where some of the characteristics pretty much taken for granted with link layers in common use in the Internet at the time of writing are not attainable", and more generally, may comprise a network comprising one or more constrained devices as defined above.

According to further aspects and examples of the present disclosure, there are provided methods, a computing device, a node, a computer program, carrier and computer program product as set out in the appended claims.

BRIEF DESCRIPTION OF THE DRAWINGS

For a better understanding of the present disclosure, and to show more clearly how it may be carried into effect, reference will now be made, by way of example, to the following drawings in which:

FIG. 3 is a flow chart illustrating process steps in a method for managing notifications about a resource exposed by a computing device, the method performed by the computing device;

FIGS. 4a and 4b are flow charts illustrating process steps in other examples of method for managing notifications about a resource exposed by a computing device;

DETAILED DESCRIPTION

Figure 1:
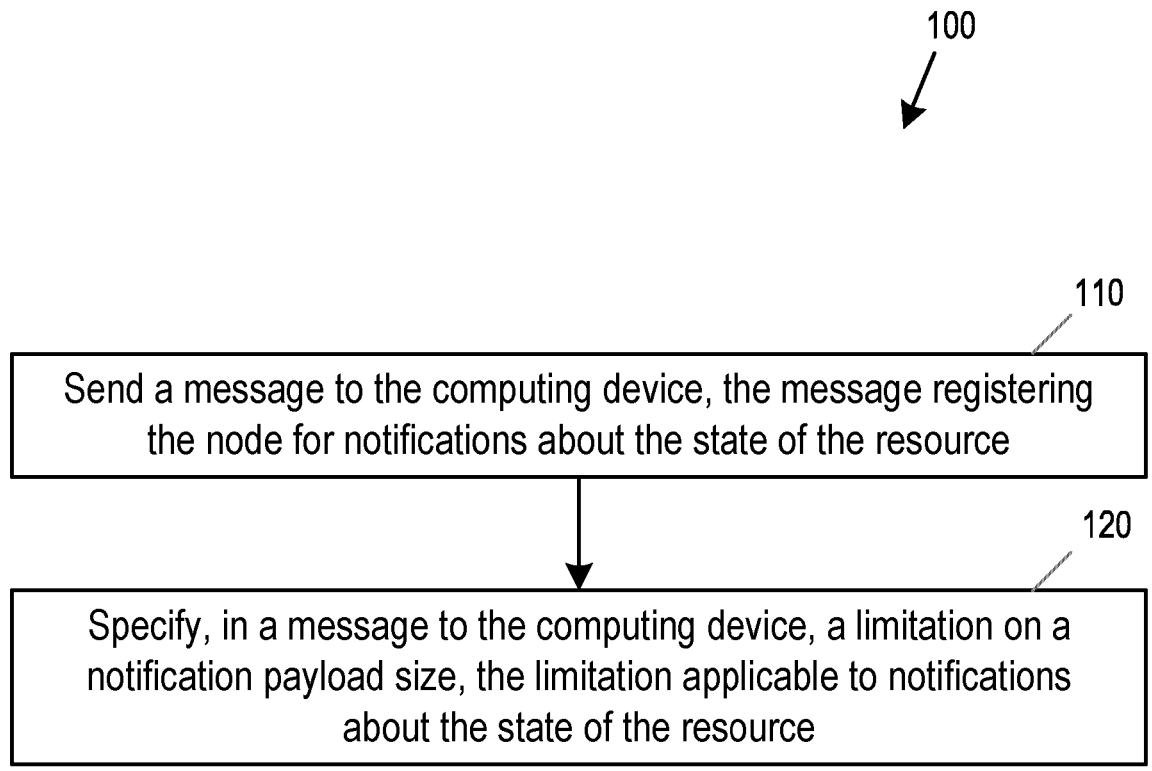
FIG. 1 is a flow chart illustrating process steps in a method for managing notifications about a resource exposed by a computing device, the method performed by a node.

Aspects of the present disclosure provide a mechanism by which a node, which may for example be running a CoAP client and/or LwM2M server, can place a limitation upon the payload size of notifications that it is to receive about the state of observed resources. The node may for example be a management server with management responsibility for one or more computing devices hosting resources. In other examples, the node may itself comprise a computing device operable to expose one or more resources to a network.

In some examples, the limitation placed upon the payload size of notifications may be set through the creation of observations with new Observe Attributes: "szlt" (Size Less Than) and "szgt" (Size Greater Than) that indicate the largest or smallest payload that an observation notification should have. Observation notifications that exceed these limits may then be suppressed by the CoAP server exposing the relevant resource, so saving network bandwidth and resources in the client.

The node may determine the limitation that should be placed on notification payload size according to a range of criteria. In one example, the node may be aware of restrictions on the size of the CoAP payload that it (as a host or as part of a network) can conveniently handle, and can therefore set a limitation on notification payload size accordingly. In another example, if a device has multiple network interfaces (such as Narrowband IoT (NB-IoT) and LTE), a node can optimize the use of the interfaces by setting the payload size limitation so that small payloads are sent using a low-bandwidth interface and large payloads using the interface with more bandwidth (but potentially higher power consumption for small packets). To achieve this, the node may perform two Observe requests: one requesting large payloads sent to the IP address of the high-bandwidth interface and another requesting small payloads sent to the IP address of the low-bandwidth interface. The computing device responds to the request on the interface it received the request on.

In another example, when different management servers have different capabilities for processing large payloads, for example owing to network conditions or an amount of storage/memory available at the node, the nodes may cooperate to ensure that different nodes start observation requests for different payload sizes accordingly. In a still further example, subscription information for the computing device may be used to guide the setting of a payload size limitation. For example, a node may check subscription details with a core network node, the details including data cap, bitrate, price for amount of data transferred, cap on number of messages, etc. If the node finds that the subscription is limited to certain traffic characteristics, it may set notification payload size limits accordingly, to ensure that the computing device does not exceed its limits by servicing the observe request, and retains, for example, space in the data cap for other device usage.

The mechanism of the present disclosure may be implemented through the performance of methods in a node and a computing device as set out below and illustrated in FIGS. 1 to 4b.

FIG. 1 is a flow chart illustrating process steps in a method 100 for managing notifications about a resource exposed by a computing device, the method performed by a node. The node may comprise any device, server or other entity that is operable to connect to a network, and may be a functional entity which may be deployed on one or more physical or virtual nodes. The node may be operable to run one or more of a CoAP client application and/or a LwM2M server application and may for example comprise a management server, or may comprise a computing device, as discussed below. The computing device may comprise any device that is provided with some form of processing circuitry and is operable to expose at least one resource to a network. The computing device may for example be a constrained device as discussed above, and may be operable to run one or more of a CoAP server application and/or LwM2M client application.

Referring to FIG. 1, the method 100 comprises, in a first step 110, sending a message to the computing device, the message registering the node for notifications about the state of the resource. The message may for example be a CoAP observation registration, including the Observe Option with a value set to 0. In step 120, the method comprises specifying, in a message to the computing device, a limitation on a notification payload size, the limitation applicable to notifications about the state of the resource. The message in which the limitation on a notification payload size is specified may comprise at least one of the message registering the node for notifications about the state of the resource (the message sent in step 110) or a dedicated message for communicating the limitation to the computing device.

Different options for how to specify a limitation on a notification payload size are discussed below, with reference to FIGS. 2a to 2c.

Figure 2A:
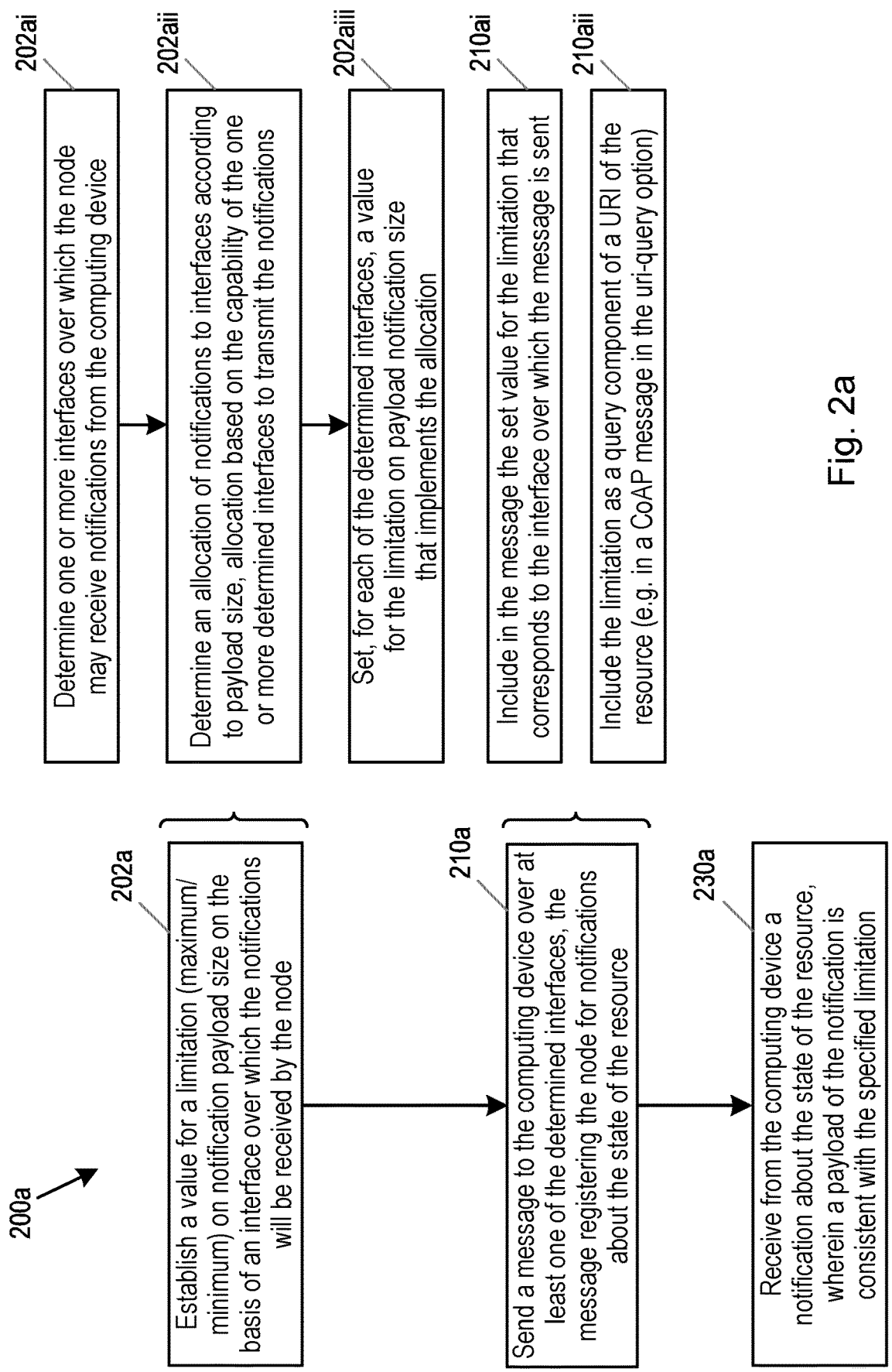
FIGS. 2a to 2c are flow charts illustrating process steps in other examples of method for managing notifications about a resource exposed by a computing device.
Figure 2B:
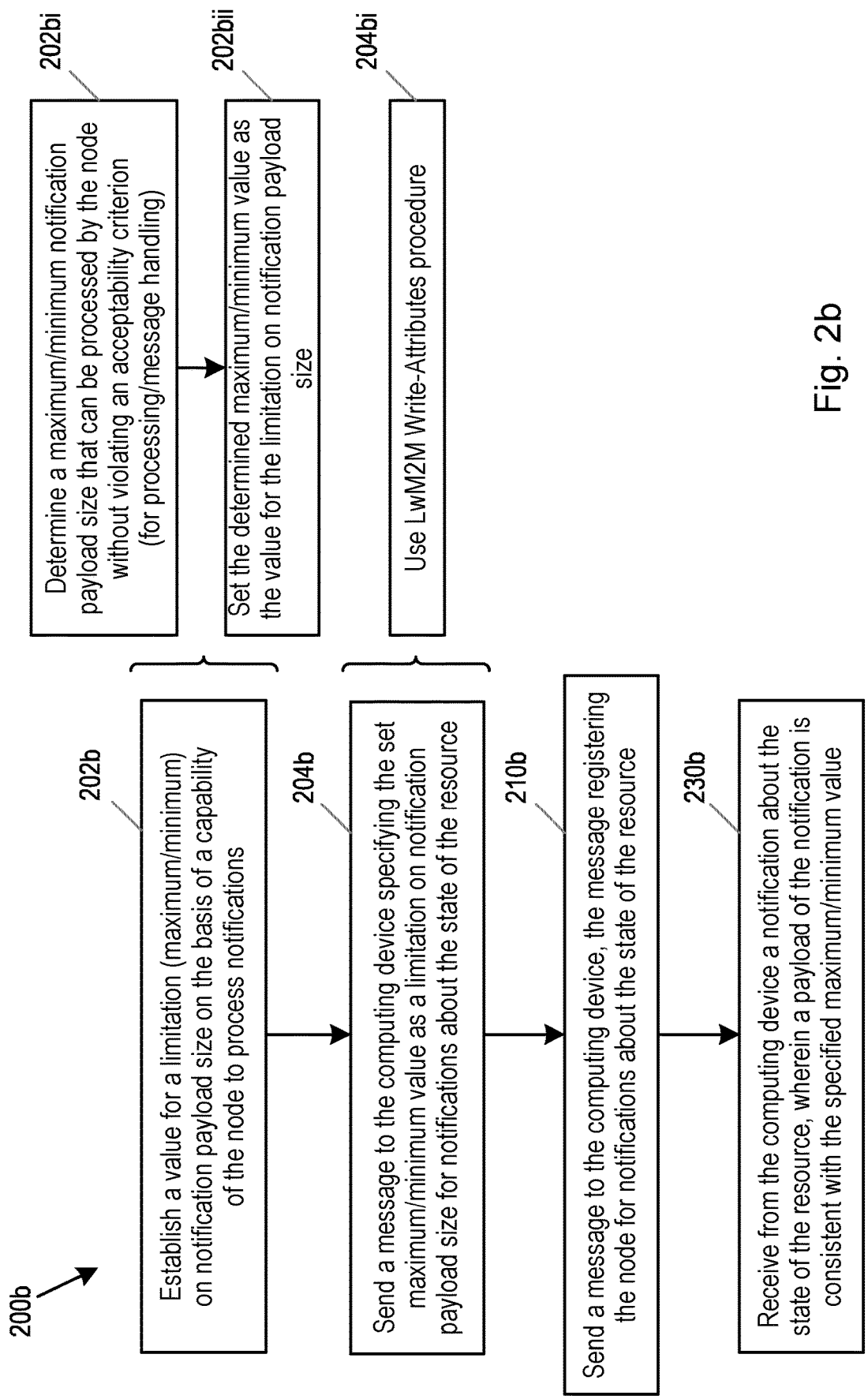
Figure 2C:
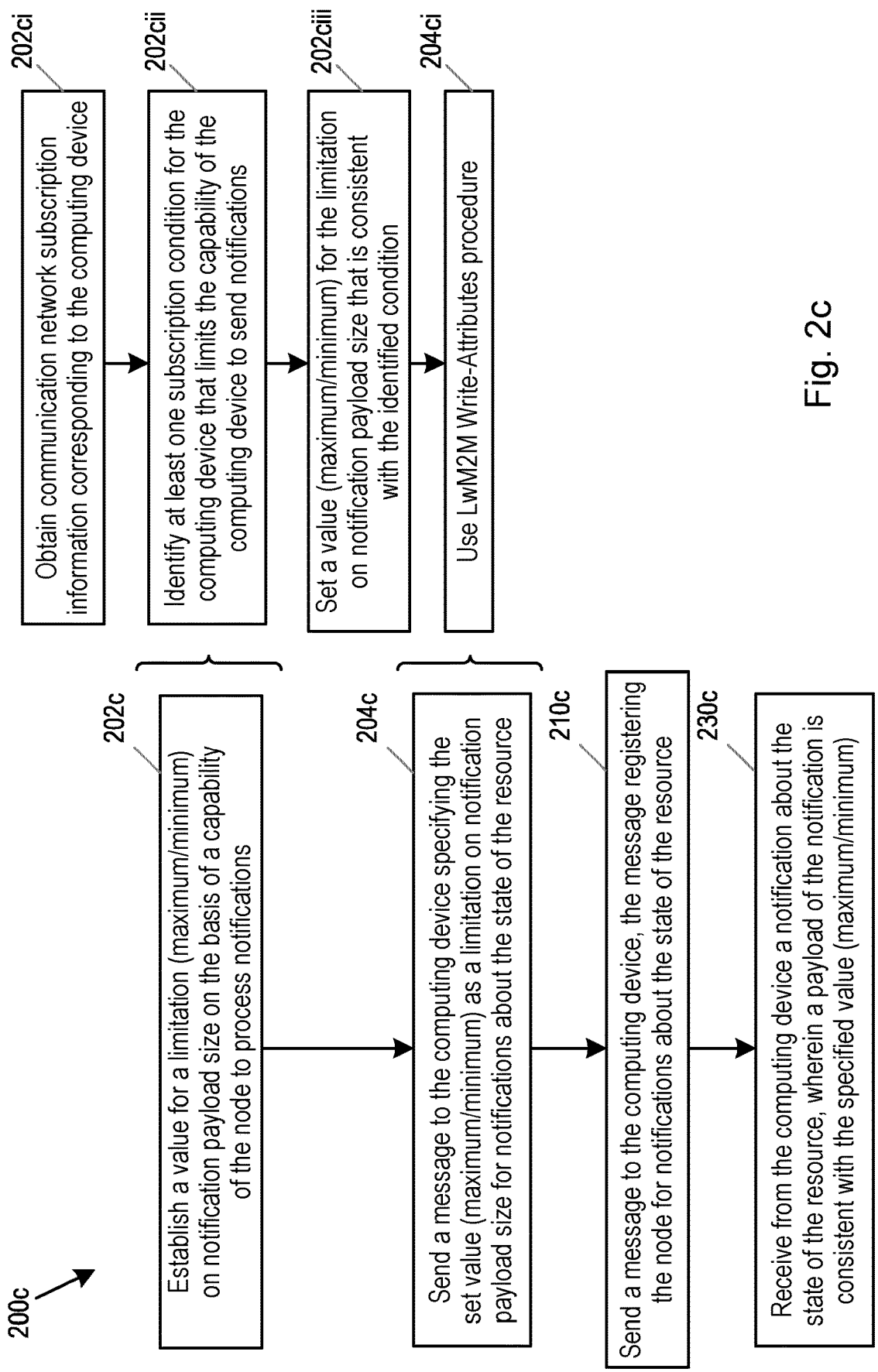

FIGS. 2a to 2c are flow charts illustrating other example methods 200a, 200b, 200c for managing notifications about a resource exposed by a computing device, the methods performed by a node. The steps of the methods 200a, 200b and 200c illustrate different examples of how the steps of the method 100 may be implemented and supplemented to provide the above discussed and additional functionality. As for the method 100, the node performing the methods 200a, 200b and/or 200c may comprise any device, server or other entity that is operable to connect to a network. The node may be a functional entity which may be deployed on one or more physical or virtual nodes and may for example comprise a management server, or may comprise a computing device, as discussed below. The node may be operable to run one or more of a CoAP client application and/or a LwM2M server application. The computing device may comprise any device that is provided with some form of processing circuitry and is operable to expose at least one resource to a network. The computing device may for example be a constrained device as discussed above, and may be operable to run one or more of a CoAP server application and/or LwM2M client application.

Referring initially to FIG. 2a, in a first example method 200a, a node first establishes, at step 202a, a value for the limitation on notification payload size on the basis of an interface over which the notifications will be received by the node. As illustrated at step 202ai to 202aiii, the step 202a of establishing a value for a limitation on a notification payload size on the basis of an interface over which the notifications will be received may comprise, in step 202ai, determining one or more interfaces over which the node may receive notifications from the computing device. The node may be operable to receive notifications from the computing device over multiple different interfaces, including for example the Narrowband IoT (NB-IoT) interface, an LTE interface, a 5G interface, a WiFi interface etc. In step 202aii, the node may determine an allocation of notifications to the determined one or more interfaces according to the payload size of the notifications. The allocation may be based on the capability of the one or more determined interfaces to transmit the notifications. Each interface may for example have different limitations in terms of speed, bandwidth, etc., and so each interface may be suited to transporting notifications having different payload sizes. For example, smaller notifications comprising sensor measurements may be suited to the NB-IoT interface, with larger device information reports being more suited to the faster but more power consuming LTE or 5G interface. In step 202aiii, the node may set, for each of the one or more determined interfaces, a value for the limitation on notification payload size that implements the determined allocation. The limitation may comprise at least one of a maximum or minimum payload size for notifications about the state of the resource. Thus to continue the above example, a maximum payload size may be set for the NB-IoT interface, and a minimum payload size may be set for the LTE interface, such that notifications are divided between the interfaces as discussed above.

In step 210a, the node sends a message to the computing device over at least one of the determined interfaces, the message registering the node for notifications about the state of the resource. As illustrated in step 210ai, the node may include in the message the set value for the limitation that corresponds to the interface over which the message is sent. Thus in the above example, the maximum payload size limitation for notifications sent over the NB-IoT interface would be included in an Observe registration message sent to the computing device over the NB-IoT interface. As illustrated in step 210aii, the limitation may for example be included as a query component of a Uniform Resource Identifier (URI) of the resource. The Observe registration message may be a CoAP message with the Observe option set to 0, and the limitation may be included in the uri-query option.

In step 230a, the node receives from the computing device a notification about the state of the resource, wherein a payload of the notification is consistent with the specified limitation. The notification is received over the interface to which the limitation applies, and over which the Observe registration message was sent in step 210a. It will be appreciated that several Observe registration messages may be sent in step 210a, one message over each of the interfaces over which the node may receive notifications, and each message including the payload size limitation that has been set for that interface. The node thus receives notifications in step 230a over the interface that is most suited to convey the notifications.

Referring now to FIG. 2b, in another example method 200b, a node first establishes, at step 202b, a value for the limitation on notification payload size on the basis of a capability of the node to process notifications. As illustrated at step 202bi and 202bii, the step 202b of establishing a value for a limitation on a notification payload size on the basis of a capability of the node to process notifications may comprise, in step 202*bi*, determining a maximum notification payload size that can be processed by the node without violating an acceptability criterion for processing at the node, and/or determining a minimum notification payload size that can be processed by the node without violating an acceptability criterion for message handling at the node. According to examples of the present disclosure, the determination of maximum and minimum notification payload sizes may take into account both network conditions (congestion, etc.) and conditions within the node (available memory, processing capacity etc.).

In some examples, determining a maximum or minimum notification payload size that can be processed by the node without violating an acceptability criterion may comprise cooperating with at least one other node. An example of such cooperation may include negotiating amongst nodes a division of notifications according to individual capabilities for processing requests at the nodes. Such negotiation may be repeated to account for evolving conditions at the nodes and in the network.

In step 202*bii*, the node sets the determined maximum and/or minimum value as the value for the limitation on notification payload size.

In step 204*b*, the node sends a message to the computing device specifying the set limitation (maximum and/or minimum size) for payloads of notification about the state of a resource. This message may be a dedicated message for communicating the limitation to the computing device and may set a value of a Notification Payload Size Attribute of the resource. The value of the Notification Payload Size Attribute of the resource may be set in this dedicated message using the LwM2M Write-Attributes operation.

In step 210*b*, the node sends a message to the computing device, the message registering the node for notifications about the state of the resource. This message may for example be an Observe registration, with the Observe option set to 0. In step 230*b*, the node receives from the computing device a notification about the state of the resource, wherein a payload of the notification is consistent with the specified limitation.

Referring now to FIG. 2*c*, in another example method 200*c*, a node first establishes, at step 202*c*, a value for the limitation on notification payload size on the basis of a condition included in a subscription enabling the computing device to access a communication network. As illustrated at step 202*ci* to 202*ciii*, the step 202*c* of establishing a value for a limitation on a notification payload size on the basis of a condition included in a subscription enabling the computing device to access a communication network may initially comprise, in step 202*ci*, obtaining communication network subscription information corresponding to the computing device. This may be obtained from any appropriate source of such information. In step 202*cii*, the node identifies from the obtained subscription information at least one condition included in the communication network subscription for the computing device that limits the capability of the computing device to send notifications. Such a condition may for example include a maximum daily limit on data transfer. In step 202*ciii*, the node sets a value for the limitation on notification payload size that is consistent with the identified condition. This may comprise for example setting a maximum limit on payload size notifications such that no one notification can cause the computing device to exceed its daily data limit, or a set proportion of its daily data limit. In other examples, the limit may be set to respect cost penalties for exceeding a certain amount of data sent, and/or to conform to an expected pattern or size of notifications to be received. For example, a lower maximum size limit may be set on a resource that is expected to change state frequently, prompting frequent notifications, or a larger maximum limit may be set for a resource whose notifications will always have a significantly sized payload.

In step 204*c*, the node sends a message to the computing device, the message specifying the set limitation on a notification payload size. As discussed above with reference to FIG. 2*b*, this message may be a dedicated message for communicating the limitation to the computing device and may set a value of a Notification Payload Size Attribute of the resource. The value of the Notification Payload Size Attribute of the resource may be set in this dedicated message using the LwM2M Write-Attributes operation.

In step 210*c*, the node sends a message to the computing device, the message registering the node for notifications about the state of the resource. This message may for example be an Observe registration, with the Observe option set to 0. In step 230*c*, the node receives from the computing device a notification about the state of the resource, wherein a payload of the notification is consistent with the specified limitation.

The method 100, and 200*a* to 200*c*, performed by a node, may be complimented by methods performed at a computing device, as discussed below.

FIG. 3 is a flow chart illustrating process steps in a method 300 for managing notifications about a resource exposed by a computing device, the method performed by the computing device. The computing device may comprise any device that is provided with some form of processing circuitry and is operable to expose at least one resource to a network. The computing device may for example be a constrained device as discussed above, and may be operable to run one or more of a CoAP server application and/or LwM2M client application.

Referring to FIG. 3, the method 300 comprises, in a first step 310, receiving a message from a node, the message registering the node for notifications about the state of the resource. The node may comprise any device, server or other entity that is operable to connect to a network. The node may be a functional entity which may be deployed on one or more physical or virtual nodes and may for example comprise a management server, or may comprise a computing device. The node may be operable to run one or more of a CoAP client application and/or a LwM2M server application. The message may for example comprise an Observe registration, including an Observe option with a value set to 0.

In step 320, the computing device receives, from the node, a specified limitation on a notification payload size, the limitation applicable to notifications about the state of the resource. The limitation may be received in the same message that registered the node for notifications about the state of the resource, or in a separate, dedicated message, which may be received before or after the message registering the node for notifications.

The computing device then performs step 330 and 340 of the method 300 for notifications to be sent to the node in accordance with the message received at step 310. In step 330, for a notification to be sent, the computing device determines whether a size of the payload of the notification is consistent with the specified limitation. In step 340, the computing device sends the notification to the node only if the size of the payload of the notification is consistent with the specified limitation. Notifications that are not consistent with the specified limitation may be stored, deleted or otherwise discarded.

Figure 4B:
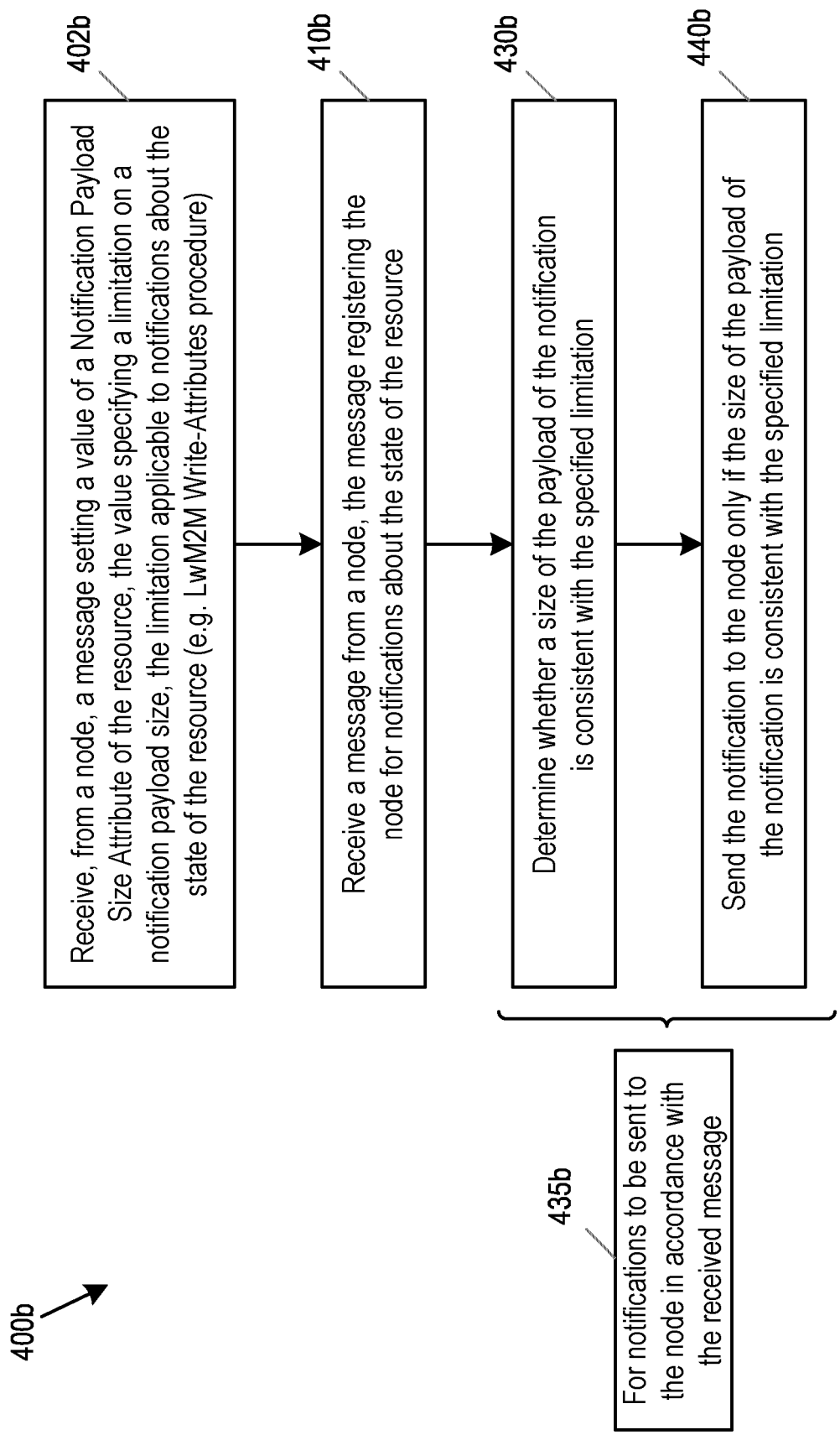

FIGS. 4a and 4b are flow charts illustrating other example methods 400a, 400b for managing notifications about a resource exposed by a computing device, the methods performed by the computing device. The steps of the methods 400a and 400b illustrate different examples of how the steps of the method 300 may be implemented and supplemented to provide the above discussed and additional functionality. As for the method 300, the computing device performing the method may comprise any device that is provided with some form of processing circuitry and is operable to expose at least one resource to a network. The computing device may for example be a constrained computing device as discussed above, and may be operable to run one or more of a CoAP server application and/or LwM2M client application.

Referring initially to FIG. 4a, in a first example method 400a, the computing device initially receives, in step 410a, a message from a node over an interface. The node may comprise any device, server or other entity that is operable to connect to a network. The node may be a functional entity which may be deployed on one or more physical or virtual nodes and may for example comprise a management server, or may comprise a computing device. The node may be operable to run one or more of a CoAP client application and/or a LwM2M server application. The message received in step 410a registers the node for notifications about the state of a resource exposed by the computing device. The computing device may be operable to receive and send messages over multiple interfaces, including for example the Narrowband IoT (NB-IoT) interface, an LTE interface, a 5G interface, a WiFi interface etc. The message registering the node for notifications, received in step 410a, may be received over any one of these or other interfaces. The message specifies a limitation on a notification payload size (for example a maximum and/or minimum payload size), the limitation applicable to notifications about the state of the resource. As illustrated in step 410ai, the limitation may be included in the message as a query component of a Uniform Resource Identifier (URI) of the resource, for example in the uri-query Option in a CoAP message.

The computing device then performs steps 430a and 440a of the method 400a for notifications to be sent to the node in accordance with the received message registering for notifications, as illustrated at step 435a. In step 430a, for a notification to be sent to the node, the computing device determines whether a size of the payload of the notification is consistent with the specified limitation. In step 440a, the computing device sends the notification to the node only if the size of the payload of the notification is consistent with the specified limitation. The computing device sends the notification over the same interface over which the message specifying the limitation was received. Notifications that are not consistent with the specified limitation may be stored, deleted or otherwise discarded.

Referring now to FIG. 4b, in another example method 400b, a computing device receives, from a node in step 402b, a specified limitation on a notification payload size, the limitation applicable to notifications about the state of a resource exposed by the computing device. As illustrated in step 402b, the received message sets a value of a Notification Payload Size Attribute of the resource, and the message may be received as part of the LwM2M Write-Attributes procedure.

In step 410b, the computing device receives a message from the node, the message registering the node for notifications about the state of the resource. The message received at step 410b may for example be an Observe registration message, with a value of the Observe option set to 0. For notifications to be sent to the node in accordance with the received Observe registration (step 435b), the computing device, at step 430b, determines whether a size of the payload of the notification is consistent with the specified limitation, and, in step 440b, sends the notification to the node only if the size of the payload of the notification is consistent with the specified limitation.

FIGS. 1 to 4b thus illustrate different examples of method performed at a node and a computing device which may implement the mechanism of the present disclosure.

As discussed above, the LwM2M protocol defines various attributes for different operations (WRITE, READ, etc.). In some examples of the present disclosure, the limitation on notification payload size that is specified according to the methods 100 to 400b may be set through the creation of observations with new Observe Attributes: "szlt" (Size Less Than) and "szgt" (Size Greater Than) that indicate the largest or smallest payload that an observation notification should have.

szlt (Size Less Than) attribute may be used with the GET method and when the Observe Option is set to 0 (Observe register). This attribute indicates the maximum size that the CoAP Client (or LwM2M server) wishes to receive. As discussed above, this may correspond to a maximum size that the CoAP client can process without creating processing problems, or may be used to distribute notifications across different interfaces or between different nodes, or may correspond to limitations included in a network subscription for the CoAP server exposing the resource.

szgt (Size Greater Than) attribute may also be used with the GET method and when the Observe Option is set to 0 (Observe register). This attribute indicates the minimum size that the CoAP Client (or LwM2M server) wishes to receive. As discussed above, this may correspond to a minimum size that the CoAP Client can process without creating message handling problems, or may be used to distribute notifications across different interfaces or between different nodes, or may correspond to limitations included in a network subscription for the CoAP server exposing the resource.

The szlt and szgt attributes are illustrated below in the format in which link attributes are presented in the LwM2M specification.

| Attribute Name | CoRE Link param | Attachment | Assignation Level | Required | Access Mode | Value Type | Default Value | Apply Condition |
|---|---|---|---|---|---|---|---|---|
| Size Greater Than | "szgt" "=" 1*DIGIT ["." 1*DIGIT] | Resource | Resource Resource Instance Object Object Instance | No | RW | Float | — | Numerical & Readable Resource |

Notes:
Indicates the minimum size payload of the resource representation that the CoAP Client should communicate. When the "szgt" attribute is present, the LwM2M Client MUST notify the Server only when the Observed Resource

| Attribute Name | CoRE Link param | Attachment | Assignation Level | Required | Access Mode | Value Type | Default Value | Apply Condition |
|---|---|---|---|---|---|---|---|---|
| payload size is higher than the sgzt value. | | | | | | | | |
| Size Less Than | "szlt" "=" 1*DIGIT ["."] 1*DIGIT] | Resource | Resource Resource Instance Object Object Instance | No | RW | Float | — | Numerical & Readable Resource |

Notes:
Indicates the maximum size payload of the resource representation that the CoAP Client should communicate. When the "szlt" attribute is present, the LwM2M Client MUST notify the Server only when the Observed Resource payload size is lower than the slzt value.

Figure 5:
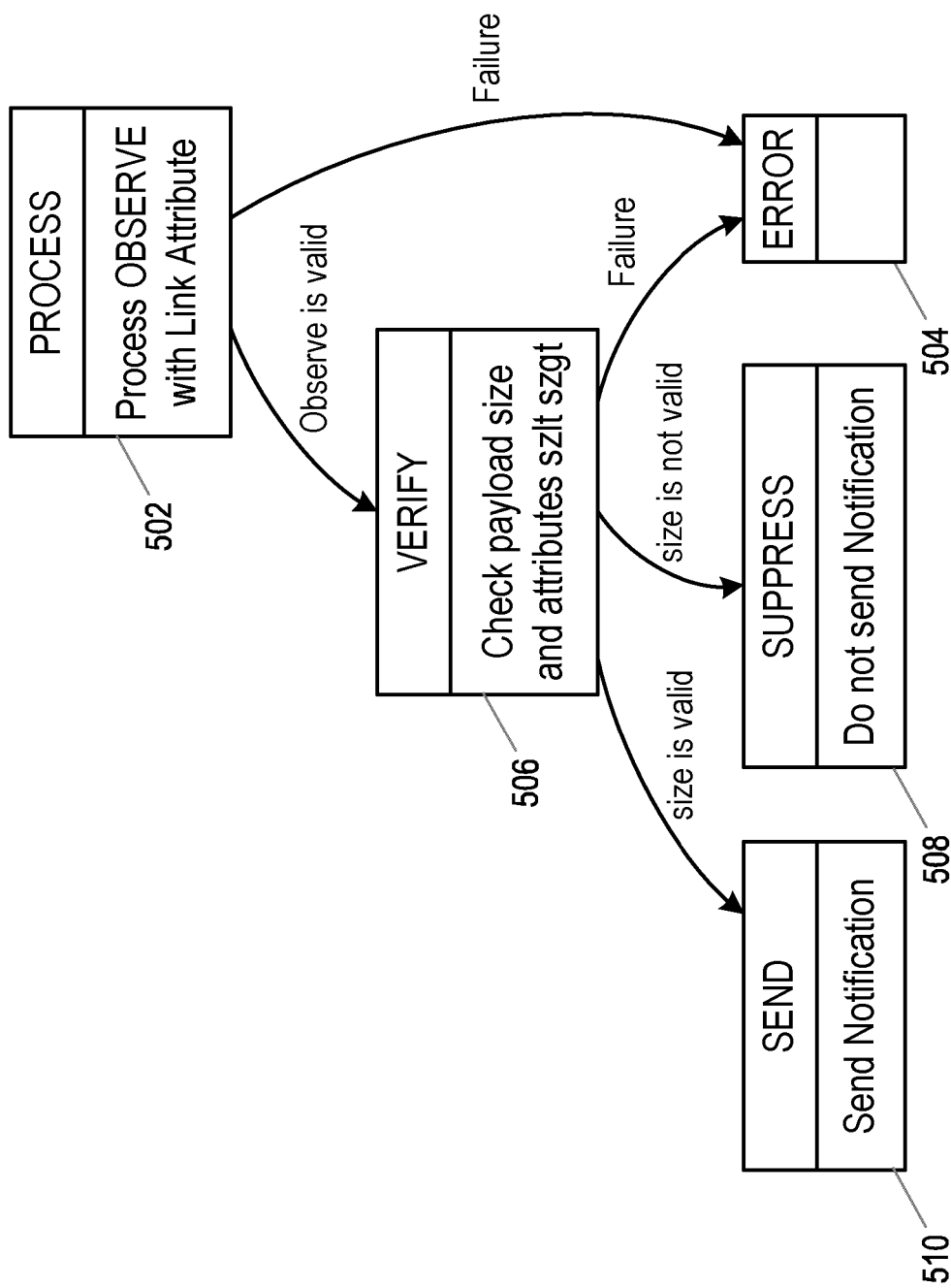
FIG. 5 illustrates computing device logic that may process a limitation on payload size in accordance with the methods of FIGS. 3, 4a and 4b.

FIG. 5 illustrates computing device logic that may process a szlt and/or szgt link attribute in accordance with the methods 300, 400*a*, 400*b*. Referring to FIG. 5, the computing device processes, at 502 an Observe request with a link attribute szgt and/or szlt. If the Observe request is not valid (for example it identifies a resource that is not exposed by the computing device), the logic indicates an error at 504. If the Observe request is valid, the computing device verifies payload size of a notification for the Observe request with request to the link attributes at step 506. If the verification fails, the logic indicates an error at 504. If the size of the notification payload is not compatible with the link attribute (s), then the logic suppresses the notification at 508, and the notification is not sent. If the size of the notification payload is compatible with the link attribute(s), then the logic approves the notification for sending, and the notification is sent to the node.

Figure 6:
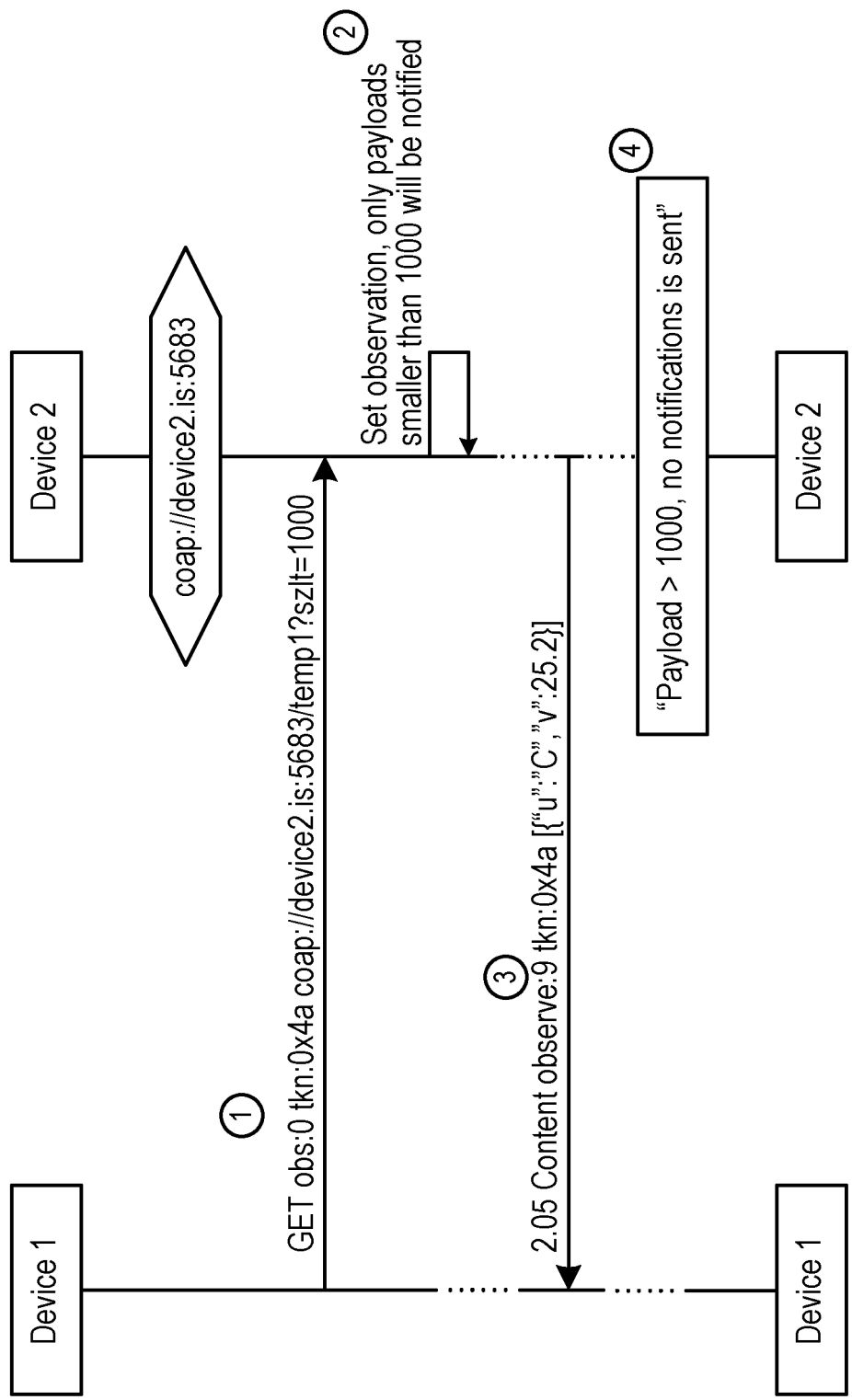
FIG. 6 illustrates a message exchange between first and second devices.
Figure 7:
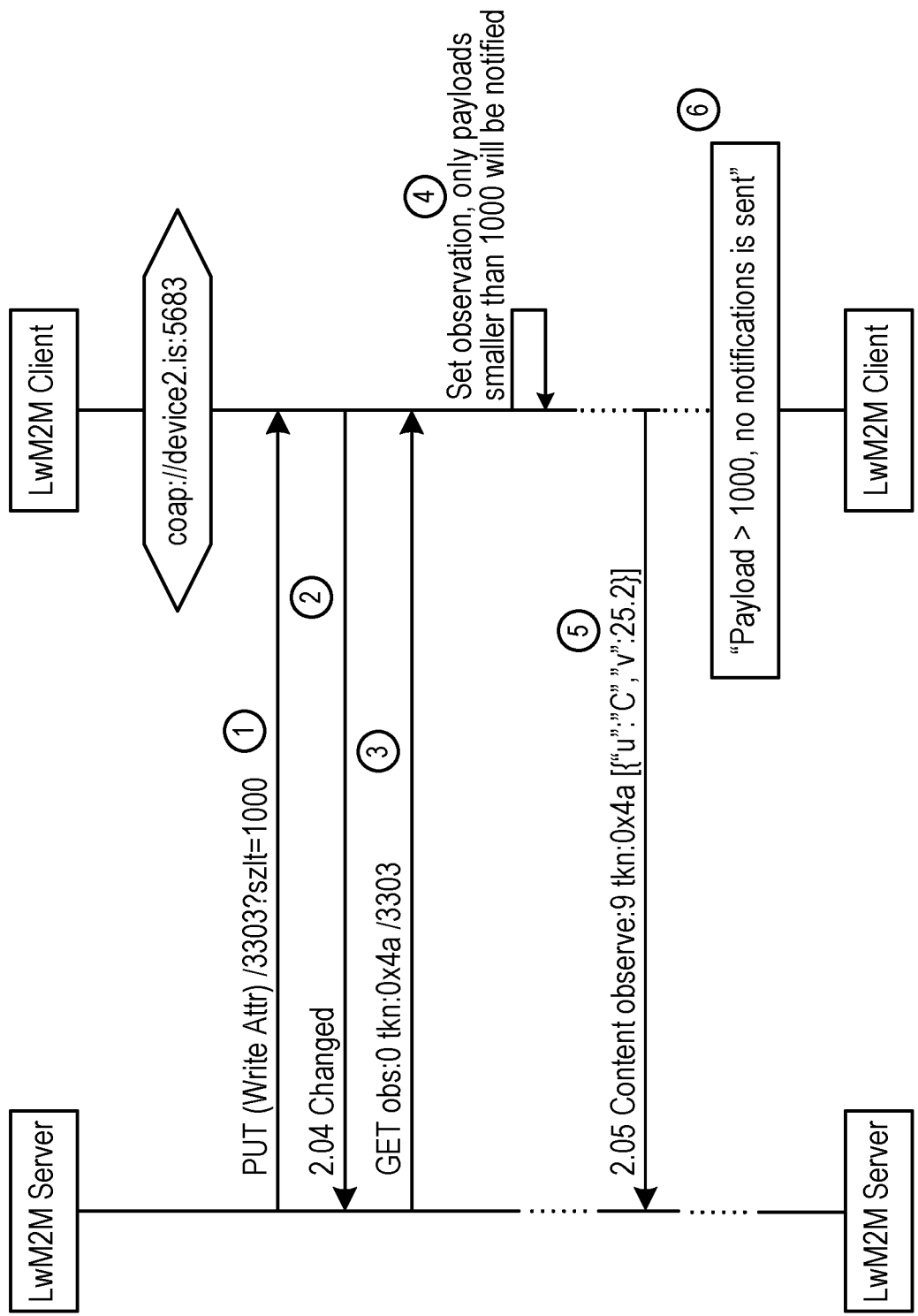
FIG. 7 illustrates a message exchange between a LwM2M client and a LwM2M server.

FIGS. 6 and 7 illustrate example message exchanges between a first and second devices according to examples of the present disclosure. FIG. 6 illustrates a message exchange using CoAP syntax between a first device, Device 1, which may for example be a node as described above, and a second device, Device 2, which may for example be a computing device as described above. Device 2 exposes various resources, including a temperature resource, temp1. Referring to FIG. 6, Device 1, being aware of its processing capabilities, sends a GET request (REQ) to a the CoAP Server Device 2 requesting to observe one of its resources in step 1. The GET request:

REQ: GET coap://device2.is:5683/temp1?szlt=1000 observe:0| token: 0x4a includes the observe option with a value of 0, indicating that the request is an observe registration, and includes the URI of the resource. Included as a query component of the URI of the resource is the link attribute szlt and the value 1000, limiting a size of the payload of notifications responding to the request to 1000 bytes. The GET request also includes the token value 0x4a, which will be included by Device 2 in notifications, allowing Device 1 to match notifications to the observe request. In step 2, the CoAP server Device 2 sets the observation and suppresses notifications above 1000 bytes of size, as indicated by the link attribute szlt. The CoAP server Device 2 then verifies that each notification is not above the maximum size. In step 3, a notification that is not above the maximum size is sent in a response (RES) to device 1 including a sequence number as the value of the observe option, the token from the observe registration and the state of the resource (temperature value) 25.2 degrees Celsius:

RES: 2.05 Content observe:9| token: 0x4a| [{"u":"Cel", "v":25.2}]

At step 4, the CoAP server Device 1 determines that the payload of a notification will be above the limit of 1000 bytes, and so suppresses the notification.

FIG. 7 illustrates a message exchange implementing the same interaction as that of FIG. 6 using LwM2M procedures. In FIG. 7, the first device is a LwM2M server and the second device is a LwM2M client. Referring to FIG. 7, the LwM2M Server first sets the attributes of the temperature object (3303) on the LwM2M client in step 1, including the attribute szlt, to limit the size of notification payloads for notifications relating to this resource:

REQ: PUT (Write Attr)/3303?szlt=1000

The LwM2M client confirms the change in step 2:

RES: 2.04 Changed

In step 3, the LwM2M server sets an observation using its information reporting interface:

REQ: GET/3303 observe:0| token: 0x4a

In step 4, the LwM2M client sets the observation and suppresses notifications above 1000 bytes of size, as indicated by the link attribute szlt that was set for the resource 3303 in step 1. The LwM2M client then verifies that each notification is not above the maximum size. In step 5, a notification that is not above the maximum size is sent to the LwM2M server including a sequence number as the value of the observe option, the token from the observe registration and the state of the resource (temperature value) 25.2 degrees Celsius:

RES: 2.05 Content observe:9| token: 0x4a [{"u":"Cel", "v":25.2}]

Figure 8:
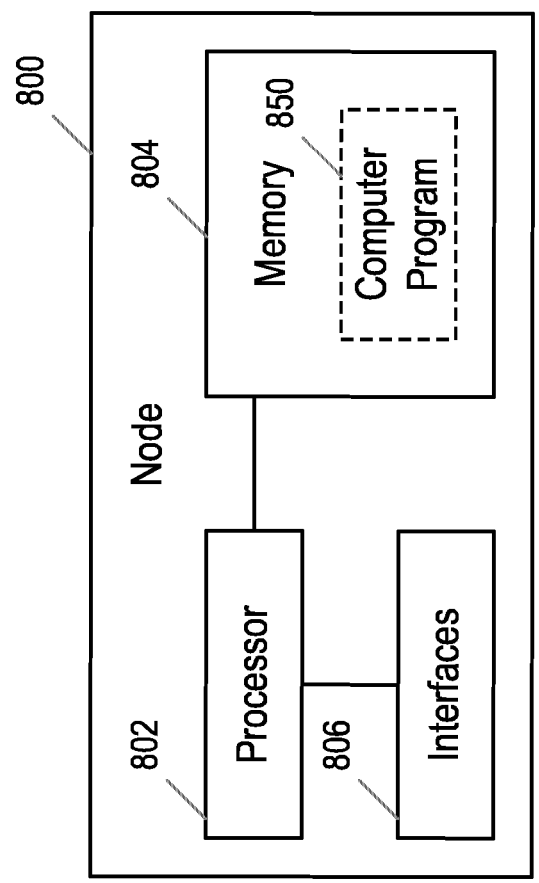
FIG. 8 is a block diagram illustrating functional modules in an example node.

FIG. 8 is a block diagram illustrating an example node 800 which may implement the method 100, 200*a*, 200*b* and/or 200*c* according to examples of the present disclosure, for example on receipt of suitable instructions from a computer program 850. Referring to FIG. 8, the node 800 comprises a processor or processing circuitry 802, and may comprise a memory 804 and interfaces 806. The processing circuitry 802 is operable to perform some or all of the steps of the method 100, 200*a*, 200*b* and/or 200*c* as discussed above with reference to FIGS. 1 and 2*a* to 2*c*. The memory 804 may contain instructions executable by the processing circuitry 802 such that the node 800 is operable to perform some or all of the steps of the method 100, 200*a*, 200*b* and/or 200*c*. The instructions may also include instructions for executing one or more telecommunications and/or data communications protocols. The instructions may be stored in the form of the computer program 850. In some examples, the processor or processing circuitry 802 may include one or more microprocessors or microcontrollers, as well as other digital hardware, which may include digital signal processors (DSPs), special-purpose digital logic, etc. The processor or processing circuitry 802 may be implemented by any type of integrated circuit, such as an Application Specific Integrated Circuit (ASIC), Field Programmable Gate Array (FPGA) etc. The memory 804 may include one or several types of memory suitable for the processor, such as read-only memory (ROM), random-access memory, cache memory, flash memory devices, optical storage devices, solid state disk, hard disk drive etc.

Figure 9:
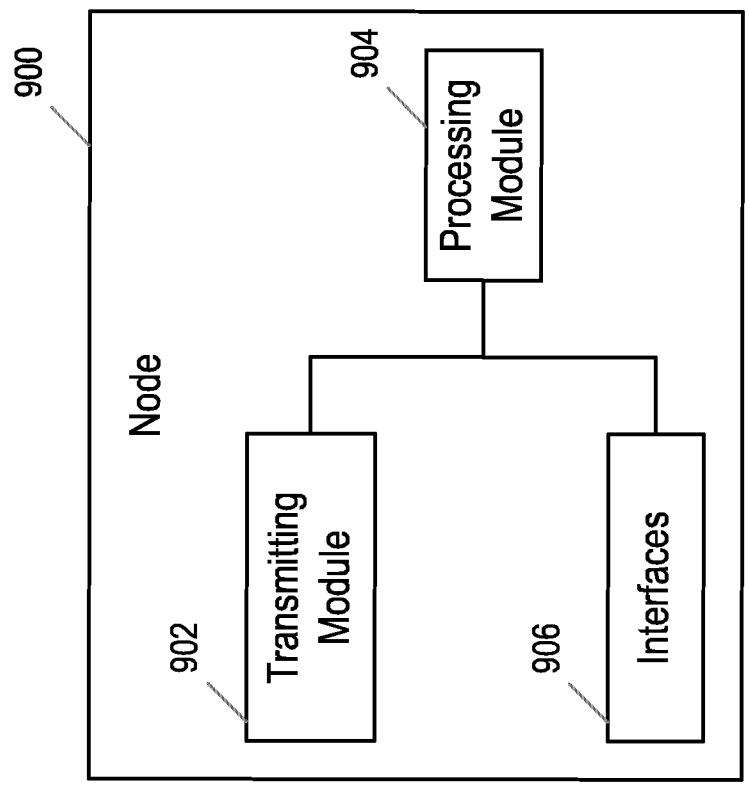
FIG. 9 is a block diagram illustrating functional modules in another example of node.

FIG. 9 illustrates functional units in another example of node 900 which may execute examples of the method 100, 200a, 200b and/or 200c of the present disclosure, for example according to computer readable instructions received from a computer program. It will be understood that the units illustrated in FIG. 9 are functional units, and may be realised in any appropriate combination of hardware and/or software. The units may comprise one or more processors and may be integrated to any degree.

Referring to FIG. 9, the node 900 comprises a transmitting module 902 for sending a message to the computing device, the message registering the node for notifications about the state of the resource. The node further comprises a processing module 904 for specifying, in a message to the computing device, a limitation on a notification payload size, the limitation applicable to notifications about the state of the resource. The node may further comprise interfaces 906.

Figure 10:
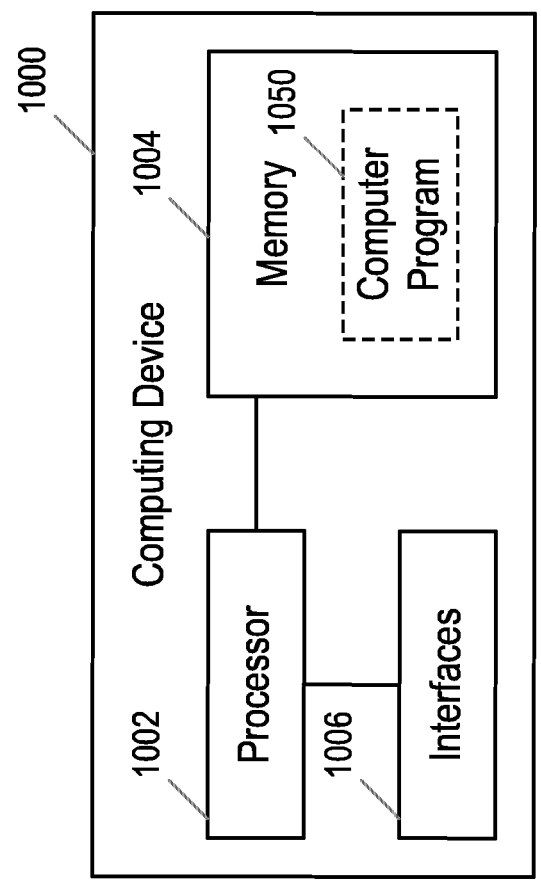
FIG. 10 is a block diagram illustrating functional modules in an example computing device.

FIG. 10 is a block diagram illustrating an example computing device 1000 which may implement the method 300, 400a and/or 400b according to examples of the present disclosure, for example on receipt of suitable instructions from a computer program 850. Referring to FIG. 10, the computing device 1000 comprises a processor or processing circuitry 1002, and may comprise a memory 1004 and interfaces 1006. The processing circuitry 1002 is operable to perform some or all of the steps of the method 300, 400a and/or 400b as discussed above with reference to FIGS. 3, 4a and 4b. The memory 1004 may contain instructions executable by the processing circuitry 1002 such that the computing device 1000 is operable to perform some or all of the steps of the method 300, 400a and/or 400b. The instructions may also include instructions for executing one or more telecommunications and/or data communications protocols. The instructions may be stored in the form of the computer program 1050. In some examples, the processor or processing circuitry 1002 may include one or more microprocessors or microcontrollers, as well as other digital hardware, which may include digital signal processors (DSPs), special-purpose digital logic, etc. The processor or processing circuitry 1002 may be implemented by any type of integrated circuit, such as an Application Specific Integrated Circuit (ASIC), Field Programmable Gate Array (FPGA) etc. The memory 1004 may include one or several types of memory suitable for the processor, such as read-only memory (ROM), random-access memory, cache memory, flash memory devices, optical storage devices, solid state disk, hard disk drive etc.

Figure 11:
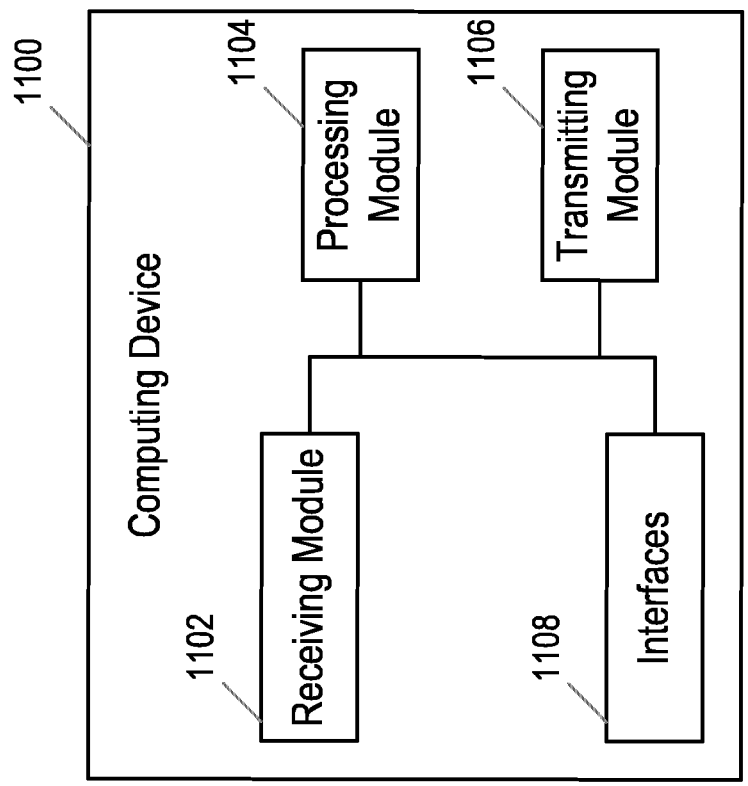
FIG. 11 is a block diagram illustrating functional modules in another example of computing device.

FIG. 11 illustrates functional units in another example of computing device 1100 which may execute examples of the method 300, 400a and/or 400b of the present disclosure, for example according to computer readable instructions received from a computer program. It will be understood that the units illustrated in FIG. 11 are functional units, and may be realised in any appropriate combination of hardware and/or software. The units may comprise one or more processors and may be integrated to any degree.

Referring to FIG. 11, the computing device 1100 comprises a receiving module 1102 for receiving a message from a node, the message registering the node for notifications about the state of the resource, and for receiving, from the node, a specified limitation on a notification payload size, the limitation applicable to notifications about the state of the resource. The computing device 1100 further comprises a processing module 1104 and a transmitting module 1106 which, for notifications to be sent to the node in accordance with the received message, determine whether a size of the payload of the notification is consistent with the specified limitation and send the notification to the node only if the size of the payload of the notification is consistent with the specified limitation. The computing device 1100 may further comprise interfaces 906.

The message exchanges of FIGS. 6 and 7 illustrate one example of how the methods of the present disclosure provide a mechanism for a node to place a limitation on the payload size for notifications that it wishes to receive. In this manner, a device may ensure notifications are consistent with its processing capabilities, or multiple different nodes with different processing capabilities can split the load of processing CoAP (LwM2M) notifications based on the size of the payload. In addition, the a device may be configured to send notifications of different size using different network interfaces, for example, using NB-IoT interface with small sensor measurements but a more power-consuming but faster LTE interface for large device information reports. A device may also or alternatively be configured to send notifications of a size that is compatible with limitations placed on the device's network access through a subscription.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing notifications about a resource exposed by a computing device, the method, performed by a node, comprising:
  sending a message to the computing device, the message registering the node for notifications about the state of the resource; and
  specifying, in a message to the computing device, a limitation on a notification payload size, the limitation applicable to notifications about the state of the resource, wherein the specifying comprises setting a value of a Notification Payload Size Attribute of the resource.

2. The method of claim 1, wherein the message in which the limitation on a notification payload size is specified comprises at least one of:
   the message registering the node for notifications about the state of the resource; or
   a dedicated message for communicating the limitation to the computing device.

3. The method of claim 1, wherein the limitation comprises at least one of a maximum or minimum payload size for notifications about the state of the resource.

4. The method of claim 1, wherein specifying, in a message to the computing device, a limitation on a notification payload size, the limitation applicable to notifications about the state of the resource, comprises including the limitation as a query component of a Uniform Resource Identifier, URI, of the resource.

5. The method of claim 1, further comprising:
   receiving from the computing device a notification about the state of the resource, wherein a payload of the notification is consistent with the specified limitation.

6. The method of claim 1, further comprising establishing a value for the limitation on notification payload size on the basis of at least one of:
   an interface over which the notifications will be received by the node;
   a capability of the node to process notifications; or
   a condition included in a subscription enabling the computing device to access a communication network.

7. The method of claim 6, wherein establishing a value for the limitation on notification payload size comprises:
   determining one or more interfaces over which the node may receive notifications from the computing device;
   determining an allocation of notifications to the determined one or more interfaces according to the payload size of the notifications, wherein the allocation is based on the capability of the one or more determined interfaces to transmit the notifications; and
   setting, for each of the one or more determined interfaces, a value for the limitation on payload notification size that implements the determined allocation.

8. The method of claim 7, wherein specifying, in a message to the computing device, a limitation on a notification payload size, comprises:
   sending the message over at least one of the determined interfaces; and
   including in the message the set value for the limitation that corresponds to the interface over which the message is sent.

9. The method of claim 6, wherein establishing a value for the limitation on notification payload size comprises:
   determining a maximum notification payload size that can be processed by the node without violating an acceptability criterion for processing at the node; and
   setting the determined maximum value as the value for the limitation on notification payload size.

10. The method of claim 6 wherein establishing a value for the limitation on notification payload size comprises:
    determining a minimum notification payload size that can be processed by the node without violating an acceptability criterion for message handling at the node; and
    setting the determined minimum value as the value for the limitation on notification payload size.

11. The method of claim 9, wherein determining a maximum or minimum notification payload size that can be processed by the node without violating an acceptability criterion comprises cooperating with at least one other node.

12. The method of claim 6, wherein establishing a value for the limitation on notification payload size comprises:
    obtaining communication network subscription information corresponding to the computing device;
    identifying from the obtained subscription information at least one condition included in the communication network subscription for the computing device that limits the capability of the computing device to send notifications; and
    setting a value for the limitation on notification payload size that is consistent with the identified condition.

13. A method for managing notifications about a resource exposed by a computing device, the method, performed by computing device, comprising:
    receiving a message from a node, the message registering the node for notifications about the state of the resource;
    receiving, from the node, a specified limitation on a notification payload size, the limitation applicable to notifications about the state of the resource; and
    for notifications to be sent to the node in accordance with the received message;
       determining whether a size of the payload of the notification is consistent with the specified limitation;
       sending the notification to the node only if the size of the payload of the notification is consistent with the specified limitation; and
    wherein receiving, from the node, the specified limitation on the notification payload size, the limitation applicable to notifications about the state of the resource, comprises receiving a message setting a value of a Notification Payload Size Attribute of the resource.

14. The method of claim 13, wherein receiving, from the node, the specified limitation on a notification payload size, the limitation applicable to notifications about the state of the resource, comprises receiving the specified limitation in at least one of:
    the message registering the node for notifications about the state of the resource; or
    a dedicated message for communicating the limitation to the computing device.

15. The method of claim 13, wherein receiving, from the node, a specified limitation on a notification payload size, the limitation applicable to notifications about the state of the resource, comprises receiving, over an interface, a message from the node in which the limitation is specified; and
    wherein sending the notification to the node only if the size of the payload of the notification is consistent with the specified limitation comprises sending the notification over the same interface over which the message specifying the limitation was received.

16. A node for managing notifications about a resource exposed by a computing device, the node comprising processing circuitry configured to:
    send a message to the computing device, the message registering the node for notifications about the state of the resource; and
    specify, in a message to the computing device, a limitation on a notification payload size, the limitation applicable to notifications about the state of the resource, wherein the specify comprises setting a value of a Notification Payload Size Attribute of the resource.

17. The node of claim 16, wherein the processing circuitry is further configured to carry out the message in which the limitation on a notification payload size is specified comprises at least one of:

the message registering the node for notifications about the state of the resource; or a dedicated message for communicating the limitation to the computing device.

18. A computing device for managing notifications about a resource exposed by the computing device, the computing device comprising processing circuitry configured to:

receive a message from a node, the message registering the node for notifications about the state of the resource;

receive, from the node, a specified limitation on a notification payload size, the limitation applicable to notifications about the state of the resource; and for notifications to be sent to the node in accordance with the received message;

determine whether a size of the payload of the notification is consistent with the specified limitation;

send the notification to the node only if the size of the payload of the notification is consistent with the specified limitation; and wherein the receive, from the node, the specified limitation on the notification payload size, the limitation applicable to notifications about the state of the resource, comprises receiving a message setting a value of a Notification Payload Size Attribute of the resource.

19. The computing device of claim 18, wherein the processing circuitry is further operable to carry out, wherein receiving, from the node, the specified limitation on the notification payload size, the limitation applicable to notifications about the state of the resource, comprises receiving the specified limitation in at least one of:

the message registering the node for notifications about the state of the resource; or a dedicated message for communicating the limitation to the computing device.

20. The computing device of claim 18, wherein the processing circuitry is further operable to carry out, wherein receiving, from the node, the specified limitation on the notification payload size, the limitation applicable to notifications about the state of the resource, comprises receiving, over an interface, a message from the node in which the limitation is specified; and wherein sending the notification to the node only if the size of the payload of the notification is consistent with the specified limitation comprises sending the notification over the same interface over which the message specifying the limitation was received.

* * * * *